United States Patent
Wu et al.

(10) Patent No.: US 11,539,418 B2
(45) Date of Patent: Dec. 27, 2022

(54) METHOD, APPARATUS FOR CHANNEL STATE INFORMATION FEEDBACK AND STORAGE MEDIUM

(71) Applicant: ZTE Corporation, Guangdong (CN)

(72) Inventors: Hao Wu, Guangdong (CN); Yu Ngok Li, Guangdong (CN); Yijian Chen, Guangdong (CN); Zhaohua Lu, Guangdong (CN); Jianxing Cai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 24 days.

(21) Appl. No.: 17/361,121

(22) Filed: Jun. 28, 2021

(65) Prior Publication Data
US 2021/0328646 A1 Oct. 21, 2021

Related U.S. Application Data

(63) Continuation of application No. 16/455,722, filed on Jun. 27, 2019, now Pat. No. 11,050,476, which is a
(Continued)

(30) Foreign Application Priority Data

Jun. 16, 2017 (CN) .......................... 201710458924.X

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0456* (2013.01); *H04B 7/0617* (2013.01); *H04L 5/0051* (2013.01); *H04L 5/0092* (2013.01)

(58) Field of Classification Search
CPC .. H04B 7/0626; H04B 7/0456; H04B 7/0617; H04B 7/0639; H04B 7/066; H04B 7/063;
(Continued)

(56) References Cited

U.S. PATENT DOCUMENTS 8,731,478 B2 5/2014 Ren et al.
10,148,334 B2 12/2018 Noh et al.
(Continued)

FOREIGN PATENT DOCUMENTS

CN 102118218 A 7/2011
CN 102801498 A 11/2012
(Continued)

OTHER PUBLICATIONS

Chinese Office Action dated Aug. 30, 2019 for Chinese Patent Application No. 201710458924.X, filed on Jun. 16, 2017 (7 pages).
(Continued)

*Primary Examiner* — Jae Y Lee
(74) *Attorney, Agent, or Firm* — Perkins Coie LLP

(57) ABSTRACT

A method and apparatus for channel state information feedback and a storage medium are provided according to the present disclosure. The method includes: performing by a terminal channel measurement according to a reference signal; selecting M subbands from K subbands of a CSI reporting band, and reporting to a base station the M subbands' Relative Power Indicator (RPI) and Phase Indicator (PI) of a weighted coefficient associated with a precoding codebook index, where M and K are integers greater than or equal to 1, M<K; each subband is a set of R resource blocks RB, where R is an integer greater than or equal to 1.

16 Claims, 4 Drawing Sheets

Related U.S. Application Data continuation of application No. PCT/CN2018/090580, filed on Jun. 11, 2018.

(58) Field of Classification Search
CPC .. H04B 7/0478; H04B 7/0413; H04B 7/0486; H04B 7/0632; H04B 7/0663; H04L 5/0051; H04L 5/0092; H04L 5/0053; H04L 5/005; H04L 5/0057; H04L 5/0048

See application file for complete search history.

(56) References Cited

U.S. PATENT DOCUMENTS

| | | | |
|---|---|---|---|
| 10,833,747 | B2 | 11/2020 | Muruganathan et al. |
| 11,050,476 | B2 | 6/2021 | Wu et al. |
| 2009/0046569 | A1 | 2/2009 | Chen et al. |
| 2012/0040622 | A1 | 2/2012 | Ren et al. |
| 2016/0007339 | A1 | 1/2016 | Kim et al. |
| 2016/0142117 | A1 | 5/2016 | Rahman et al. |
| 2016/0157218 | A1 | 6/2016 | Nam |
| 2017/0279514 | A1 | 9/2017 | Rahman et al. |
| 2017/0302353 | A1* | 10/2017 | Rahman ............... H04B 7/0486 |
| 2017/0359811 | A1* | 12/2017 | Yamada ............... H04B 7/0469 |
| 2018/0041321 | A1 | 2/2018 | Guo |
| 2018/0131486 | A1 | 5/2018 | Liu et al. |
| 2018/0248606 | A1 | 8/2018 | Choi et al. |
| 2018/0254922 | A1 | 9/2018 | Stirling-Gallacher et al. |
| 2018/0262253 | A1* | 9/2018 | Rahman ............... H04B 7/0452 |
| 2018/0302140 | A1* | 10/2018 | Rahman ............... H04B 7/0639 |
| 2018/0323926 | A1 | 11/2018 | Cezanne et al. |
| 2019/0273587 | A1* | 9/2019 | Takeda ................. H04W 72/04 |
| 2019/0319689 | A1 | 10/2019 | Wu et al. |

FOREIGN PATENT DOCUMENTS

| | | |
|---|---|---|
| CN | 104202276 A | 12/2014 |
| CN | 105247809 A | 1/2016 |
| CN | 108111200 A | 6/2018 |
| JP | 2016-529758 A | 9/2016 |
| KR | 10-2017-0020274 A | 2/2017 |
| WO | 2010/124473 A1 | 11/2010 |
| WO | 2017/082634 A1 | 5/2017 |

OTHER PUBLICATIONS

Chinese Office Action dated Dec. 4, 2019 for Chinese Patent Application No. 201710458924.X, filed on Jun. 16, 2017 (13 pages).

CHTT, "Discussion on inter-CSI-RS-resource feedback for DLCoMP," 3GPP TSG-RAN WG1 #68, Dresden, Germany, R1-120120, 3 pages, Feb. 2012.

Extended Search Report dated Jul. 27, 2020 for European Application No. 18818726.4, filed on Jun. 11, 2018 (12 pages).

Frank et al., "Fair Performance Comparison between CQI- and CSI-based MU-MIMO for the LTE Downlink," European Wireless Conference, 978-1-4244-6001, IEEE, Apr. 2010, pp. 93-98.

International Search Report and Written Opinion dated Aug. 15, 2018 for International Application No. PCT/CN2018/090580, filed on Jun. 11, 2018 (16 pages).

Japanese Office Action dated Mar. 30, 2021 for Japanese Patent Application No. 2019-569261, filed on Jun. 11, 2018 (4 pages).

Korean Office Action dated Oct. 29, 2020 for Korean Patent Application No. 10-2020-7001539, filed on Jun. 11, 2018 (12 pages).

Samsung, "Test case design for advanced CSI reporting," 3GPP TSG-RAN WG4 Meeting #83, Hangzhou, China, R4-1706034, 6 pages, May 2017.

ZTE, "Type II CSI feedback based on linear combination,"3GPP TSG RAN WG1 Meeting #88bis, Hangzhou, China, RI-1707127, 14 pages, May 2017.

ZTE, "Remaining issues on linear combination codebook," 3GPP TSG RAN WG1 Meeting #88, Athens, Greece, R1-1701838, 3 pages, Feb. 2017.

ZTE, ZTE Microelectronics, "Feedback mechanism for linear combination based CSI," 3GPP TSG RAN WG1 Meeting #86bis, Lisbon, Portugal, R1-1608684, 6 pages, Oct. 2016.

LG Electronics, "Discussion on CSI feed back Type II," 3GPP TSG RAN WG1 Meeting #88bis, Spokane, U.S.A., R1-1704884, 4 pages, Apr. 7, 2017.

Huawei et al., "Advanced CSI feed back framework for LTE," 3GPP TSG RAN WG1 Meeting #85, Nanjing, China, R1-164856, 6 pages, May 23-27, 2016.

Korean Notice of Allowance of Patent dated May 21, 2021 for Korean Patent Application No. 10-2020-7001539, filed on Jun. 11, 2018 (6 pages).

LG Electronics, "Discussion on CSI feedback Type II," 3GPP TSG RAN WG1 Meeting #89, Hangzhou, China, R1-1707611, 6 pages, May 15-19, 2017.

Ericsson, "Codebook design for Type II CSI feedback," 3GPP TSG-RAN WG1#89, Hangzhou, China, R1-1708688, 12 pages, May 15-19, 2017.

Huawei et al., "WF on CSI-RS pattern design," 3GPP TSG RAN WG1 Meeting #89, Hangzhou, China, R1-1709572, 3 pages, May 15-19, 2017.

Japanese Office Action dated Nov. 24, 2021 for Japanese Patent Application No. 2019-569261, filed on Jun. 11, 2018 (6 pages).

Indian Office Action dated Oct. 21,2021 for Indian Patent Application No. 202047001313, filed on Jun. 11, 2018 (6 pages).

\* cited by examiner

METHOD, APPARATUS FOR CHANNEL STATE INFORMATION FEEDBACK AND STORAGE MEDIUM

CROSS-REFERENCE TO RELATED APPLICATIONS

This patent document is a continuation of U.S. application Ser. No. 16/455,722, filed on Jun. 27, 2019, entitled "METHOD, APPARATUS FOR CHANNEL STATE INFORMATION FEEDBACK AND STORAGE MEDIUM" which is a continuation of and claims the benefit of priority to International Patent Application No. PCT/CN2018/090580, filed on Jun. 11, 2018, which claims the benefit of priority to Chinese Patent Application No. 201710458924.X, filed on Jun. 16, 2017. The entire contents of the before-mentioned patent applications are incorporated by reference as part of the disclosure of this application.

TECHNICAL FIELD

The present disclosure relates to, but is not limited to, the field of channel quality measurement.

BACKGROUND

In a wireless communication system, multiple antennas are used at the transmitting end and the receiving end to achieve a higher rate. The principle of Multiple-Input Multiple-Output (MIMO) is to establish a multi-layer transmission that matches the channel characteristics by using some channel characteristics, thereby effectively improving system performance without increasing bandwidth and power. MIMO is a promising technology that is widely used in current systems. For example, Long Term Evolution (LTE) and Long Term Evolution-Advanced (LTE-A) as the enhancement version of LTE, include many multi-antenna transmission modes (Transmission Mode 2 to Transmission Mode 10).

In general, there are two Channel State Information (CSI) feedback mechanisms, i.e., periodic feedback and aperiodic feedback. For example, in LTE system, the periodic feedback is performed on a Physical Uplink Control Channel (PUCCH); and the aperiodic feedback is performed on a Physical Uplink Shared Channel (PUSCH). A terminal may report CSI in the following two methods. The terminal may be configured by a base station to measure and quantize channel information, and to periodically report on the PUCCH the quantized CSI which includes Rank Indicator (RI)/Precoding Matrix Indicator (PMI)/Channel Quality Indication (CQI). Alternatively, the terminal may also be triggered aperiodically by the base station to report CSI including RI/PMI/CQI when needed, mostly on the PUSCH. Aperiodic feedback cures the problems of periodic feedback having a poor real-time performance and the CSI quantization accuracy being limited by the control channel overhead.

The basic principle of quantized channel information feedback based on codebook is as follows.

Assuming that a limited feedback channel capacity is Bbps/Hz, and the number of codewords available is $N=2B$. Eigenvectors of the channel matrix are quantized to form a codebook space $\Re = \{F_1, F_2 \ldots F_N\}$. The transmitting end and the receiving end may both store or generate in real time the codebook (the same at both ends). According to an obtained channel matrix H, the receiving end selects from $\Re$ a codeword $\hat{F}$ that best matches the channel based on a certain criteria, and reports a codeword sequence number i (i.e., PMI) to the transmitting end. The transmitting end finds the corresponding precoding codeword $\hat{F}$ according to the sequence number i, thereby obtaining channel information, where $\hat{F}$ is eigenvector information of the channel.

The principle of codeword design in LTE is as follows:

LTE codebooks continue to evolve as the standard evolves. In Releases 8 and 9, the 4-antenna codebook and the 2-antenna codebook are single-codeword codebooks, indicating one PMI, represented as $i=1, \ldots, N11$, with N11 being the number of codewords. The 8-antenna codebook of Release 10 and the 4-antenna codebook of Release 12 are double-codeword codebooks, written in the form of W=W1W2, where W1 is the codebook for a long-term feedback, called a first codebook, and W2 is the codebook for a short-term feedback, called a second codebook. W2 is used for selecting one beam out of the M1 candidate beams in W1 codewords, and for determining co-phasing for the selected beam in each polarization direction on the same data layer. Each codeword in W2 is quantized and reported by PMI2, represented as $i2=1, \ldots, M1$, with M1 being the number of W2, which refers to LTE Release 10 for details.

Codewords before Release 12 are designed for a 1D antenna array, belonging to the category of 1D codewords. In Release 13, the dimension of the codebook increases due to the use of more antennas. The topology of the antennas is generally planar, i.e., 2D codewords are designed for a 2-dimensional antenna array. Therefore, each beam in the first codebook W1 has a two-dimensional form $v_m \otimes u_n$, where vm and un are Discrete Fourier Transform (DFT) vectors of the first dimension antenna and the second dimension antenna respectively, and $v_m \otimes u_n$ denotes the Kronecker product of vm and un, where $m=1, 2, \ldots, B1$, and $n=1, 2, \ldots, B2$. The number of first-dimension ports (including antennas/ports/transmission units/dipoles/array elements/any other apparatus capable of sending signals) is N1; the number of second-dimension ports is N2. DFT corresponding to the first-dimension ports is oversampled by a factor of O1; DFT corresponding to the second-dimension is oversampled by a factor of O2. The number of the aforementioned DFT vectors of the first dimension antenna or the second dimension antenna is a multiple of the oversampling factor of the number of ports, hence B1=N1*O1, B2=N2*O2, where O1 is the first-dimension oversampling factor, and O2 is the second-dimension oversampling factor. The first-dimension codebook of the first codebook is indicated by PMI11, represented as $i11=1, \ldots, N11$; and the codebook of the second-dimension of the first codebook is indicated by PMI12, represented as $i12=1, \ldots, N12$. For each index value of the PMIs11 and PMIs12, there are M1 of W2 codewords, each W2 codeword for selecting one 2-dimensional beam $v_m \otimes u_n$ out of W1 and for co-phasing in respective polarization directions. The corresponding codeword index is PMI2, represented as $i2=1, \ldots, M1$.

Without loss of generality, when the first-dimension port number N11=1 or the second-dimension port number N12=1, the codeword becomes a 1D codeword; and when the first-dimension port number N11>1 and the second-dimension port number N12>1, the codeword becomes a 2D codeword. If it is a 1D codeword and has a single-codeword structure, the codeword is represented by PMI or i; if it is a 1D codeword and has a double-codeword structure with PMI1 and PMI2, the index is represented by i1/i2; and if it is a 2D codeword, the codeword is jointly represented by PMI11, PMI12 and PMI2 or indexes i11, i12 and i2.

In current systems, precoding matrix feedback and beam configuration are based on strongest path information in the channel; information of other paths of the channel is ignored, resulting in mismatch between the feedback or configured information and the channel, thereby affecting system performance. In order to solve this problem, the 3rd Generation Partnership Project (3GPP) in its discussion over 5th-Generation (5G) introduces a codebook based on a linear combination of multipath information to New Radio Access (NR), which can greatly improve feedback accuracy and improve system performance. In a method for CSI feedback that uses a linear combination based codebook, channel information is quantized into a linear combination of multiple beams, i.e., the precoding codeword of each layer is a linear combination of multiple one-dimensional or two-dimensional DFT vectors, where each of the one-dimensional or two-dimensional DFT vectors may be reported by a PMI in the above method. Each PMI corresponds to a weighted coefficient having an amplitude and a phase, where the amplitude may be reported by Relative Power Indicator (RPI), and the phase that may be reported by Phase Indicator (PI).

The codebook based on a combination of multiple paths can better match the channel, but has a significantly high overhead because the combination requires amplitude coefficients and phase coefficients of each path be reported or configured. Moreover, a higher performance can be achieved by RPI and PI feedback on subbands; but RPI and PI feedback, if on each subband, would bring in a greater feedback overhead.

SUMMARY

A method and apparatus for CSI feedback and a storage medium are provided according to embodiments of the present disclosure.

The embodiments of the present disclosure include the technical details as follows.

A method for CSI feedback, applicable to a terminal, including:

performing channel measurement according to a reference signal; and selecting M subbands from K subbands of a CSI reporting band, and reporting to a base station the M subbands' Relative Power Indicator (RPI) and/or Phase Indicator (PI) of a weighted coefficient associated with a precoding codebook index, where M and K are integers greater than or equal to 1, M<K; each subband is a set of R resource blocks (RBs), where R is an integer greater than or equal to 1.

The embodiments above may further include: determining the value of M according to a configuration signaling from the base station, or a pre-defined rule.

In the embodiments above, the selecting M subbands from K subbands of a CSI reporting band, and reporting the RPIs and/or the PIs of M subbands may include at least one of:

selecting, according to an instruction signaling from the base station, from the K subbands, M subbands for PI and/or RPI reporting;

selecting, according to a pre-defined rule, from K subbands, M subbands for PI and/or RPI reporting; and selecting, according to a result of channel measurement, from K subbands, M subbands for PI and/or RPI reporting.

In the embodiments above, the instruction signaling may include at least one of:

a physical layer signaling, a Radio Resource Control (RRC) signaling, a Medium Access Control (MAC) signaling, Downlink Control Information (DCI), and a bitmap.

In the embodiments above, the selecting, according to a pre-defined rule, from K subbands M subbands, and reporting the PIs and/or RPIs of the M subbands include selecting according to a pre-defined rule, the pre-defined rule including at least one of:

selecting from the K subbands M subbands with the lowest frequencies;

selecting from the K subbands M subbands with the highest frequencies;

selecting from the K subbands M subbands containing subbands with the highest frequency and the lowest frequency; and selecting M subbands which are in a comb-shaped distribution in the K subbands.

In the embodiments above, the selecting according to a result of channel measurement from K subbands M subbands, and reporting the PIs and/or RPIs of the M subbands may include:

calculating CQIs of the K subbands, and selecting M subbands of the K subbands having the best CQIs for PI and/or RPI reporting.

The embodiments above may further include:

reporting to the base station numbering information of the M subbands of the K subbands having the best CQIs.

In the embodiments above, the calculating CQIs of the K subbands may include:

calculating CQIs, according to Precoding Matrix Indicators (PMIs), RPIs and PIs obtained from the channel measurement.

In the embodiments above, the selecting from K subbands of a CSI reporting band M subbands for feedback of PIs and/or RPIs may include:

dividing the K subbands into N subband sets; and determining one or more subbands from each of the subband sets, to form M subbands as the subbands for PI and/or RPI reporting.

In the embodiments above, the dividing the K subbands of the CSI reporting band into N subband sets may include dividing according to at least one of:

a signaling from the base station, an pre-defined rule, and a result of channel measurement.

In the embodiments above, the dividing the K subbands into N subband sets and determining one or more subbands from each of the subband sets may include:

dividing K subbands into N subband sets, where the n-th subband set includes Kn subbands; and determining Mn subbands from the n-th subband set, as subbands for PI or RPI reporting, where n is an integer greater than or equal to 1, and n≤N.

The embodiments above may further include determining the value of Mn according to a configuration signaling from a base station or a pre-defined rule.

In the embodiments above, the determining one or more subbands from each of the subband sets may include at least one of:

selecting, according to an instruction signaling from a base station, a corresponding number of subbands from each of the subband sets for PI and/or RPI reporting;

selecting, according to a pre-defined rule, a corresponding number of subbands from each of the sub-band sets for PI and/or RPI reporting; and selecting, according to a result of the channel measurement, a corresponding number of subbands from each of the sub-band sets for PI and/or RPI reporting.

In the embodiments above, the selecting according to a result of the channel measurement a corresponding number of subbands from each of the sub-band sets for PI or RPI reporting may include:

calculating CQIs of the K subbands; and selecting, from the Kn subbands of the n-th subband set, Mn subbands having the highest CQIs for reporting at least one of a corresponding PI, a corresponding RPI and information indicating the Mn subbands.

In the embodiments above, the selecting, according to a pre-defined rule, from the Kn subbands of the n-th subband set Mn subbands for reporting a corresponding PI and/or RPI may include at least one of:

selecting Mn subbands with the lowest frequencies from the Kn subbands;

selecting Mn subbands with the highest frequencies from the Kn subbands;

selecting from the Kn subbands Mn subbands containing subbands with the highest frequency and the lowest frequency; and selecting Mn subbands which are in a comb-shaped distribution in the Kn subbands.

The embodiments above may further include dividing the K subbands into N subband sets according to an pre-defined rule including at least:

dividing the K subbands into N subband sets evenly.

In the embodiments above, the dividing the K subbands into N subband sets according to a result of channel measurement may include at least one of:

forming subband sets, each of which includes subbands having information indicated by RPI or PI associated with a precoding codebook index, where each information differs from one another by within DR or DP, DR or DP being a predetermined value or determined by a signaling from the base station; and forming subband sets, each of which includes subbands having information indicated by RPI or PI associated with a precoding codebook index, where the information varies between the subbands in the subband set within ER or EP, ER or EP being a predetermined value or determined by a signaling from the base station.

The embodiments above may further include:

reporting to the base station a value of at least one of: N, Kn, and Mn.

A method for Channel State Information (CSI) feedback, applicable to a base station, is provided according to an embodiment of the present disclosure, which includes:

receiving, from a terminal, M subbands' Relative Power Indicator (RPI) and/or Phase Indicator (PI) of a weighted coefficient associated with a precoding codebook index, and where the M subbands are selected by the terminal from K subbands of a CSI reporting band, where M and K are integers greater than or equal to 1, M<K; each subband is a set of R resource blocks (RBs), and R is an integer greater than or equal to 1.

The embodiments above may further include:

notifying the terminal of a value of M, by a configuration signaling.

The embodiments above may further include:

notifying the terminal of order information of a comb-shaped distribution of M subbands in the K subbands, by a configuration signaling.

The embodiments above may further include:

notifying the terminal to select from the K subbands M subbands for PI and/or RPI reporting, by an instruction signaling.

The instruction signaling may include at least one of:

a physical layer signaling, a Radio Resource Control (RRC) signaling, a Medium Access Control (MAC) signaling, Downlink Control Information (DCI), and a bitmap.

The embodiments above may further include:

receiving from the terminal numbering information of the M subbands of the K subbands.

The embodiments above may further include:

notifying the terminal to divide the K subbands of the reporting bandwidth into N subband sets.

The embodiments above may further include:

notifying the terminal to determine one or more subbands from each of the subband sets, to form M subbands as the subbands for PI and/or RPI reporting.

The embodiments above may further include:

notifying the terminal to divide the K subbands of the reporting bandwidth into N subband sets, where the n-th subband set includes Kn subbands.

The embodiments above may further include:

notifying the terminal to determine Mn subbands from the n-th subband set, as subbands for PI or RPI reporting, where n is an integer greater than or equal to 1, and n≤N.

The embodiments above may further include:

receiving from the terminal at least one of: the number of subband sets, the number of subbands in each subband set, and the number of subbands for PI and/or RPI reporting in each subband set.

An apparatus for Channel State Information (CSI) feedback, provided at a terminal, is provided according to an embodiment of the present disclosure, which includes:

a measuring module, configured to perform channel measurement according to a reference signal; and a feedback module, configured to select, from K subbands of a CSI reporting band, M subbands, and report to the base station the M subbands' PI and/or RPI of a weighted coefficient associated with a precoding codebook index, where M and K are integers greater than or equal to 1, M<K; each subband is a set of R resource blocks (RBs), where R is an integer greater than or equal to 1.

In the embodiments above, the feedback module may further be configured to determine the value of M according to a configuration signaling from the base station, or a pre-defined rule.

In the embodiments above, the feedback module may further be configured to select from the K subbands of the CSI reporting band M subbands for feedback of PI and/or RPI reporting, by at least one of:

selecting, according to an instruction signaling from the base station, from the K subbands, M subbands for PI and/or RPI reporting;

selecting, according to a pre-defined rule, from the K subbands, M subbands for PI and/or RPI reporting; and selecting, according to a result of channel measurement, from the K subbands, M subbands for PI and/or RPI reporting.

In the embodiments above, the feedback module may further be configured to select, according to a pre-defined rule, from the K subbands, M subbands for PI and/or RPI reporting, where the pre-defined rule includes at least one of:

selecting from the K subbands M subbands with the lowest frequencies;

selecting from the K subbands M subbands with the highest frequencies;

selecting from the K subbands M subbands containing subbands with the highest frequency and the lowest frequency; and selecting M subbands which are in a comb-shaped distribution in the K subbands.

In the embodiments above, the feedback module may further be configured to select according to a result of channel measurement from the K subbands M subbands for PI and/or RPI reporting, by:

calculating CQIs of the K subbands, and selecting M subbands of the K subbands having the best CQIs for PI and/or RPI reporting.

In the embodiments above, the feedback module may further be configured to report to the base station numbering information of the M subbands of the K subbands having the best CQIs.

In the embodiments above, the feedback module may further be configured to calculate the CQIs of the K subbands, by:

calculating the CQIs, according to Precoding Matrix Indicators (PMIs), RPIs and PIs obtained from the channel measurement.

In the embodiments above, the feedback module may further be configured to select from the K subbands of the CSI reporting band M subbands for feedback of PI and/or RPI, by:

dividing the K subbands into N subband sets; and determining one or more subbands from each of the subband sets, to form M subbands as the subbands for PI and/or RPI reporting.

In the embodiments above, the feedback module may further be configured to divide the K subbands of the CSI reporting band into N subband sets according to at least one of:

a signaling from the base station, an pre-defined rule, and a result of channel measurement.

In the embodiments above, the dividing K subbands into N subband sets and determining one or more subbands from each of the subband sets may include:

dividing K subbands into N subband sets, where the n-th subband set includes Kn subbands;

determining Mn subbands from the n-th subband set, as subbands for PI or RPI reporting, where n is an integer greater than or equal to 1, and n≤N.

In the embodiments above, the feedback module may further be configured to determining the value of Mn according to a configuration signaling from a base station, or a pre-defined rule.

In the embodiments above, the feedback module may further be configured to determine one or more subbands from each of the subband sets, by at least one of:

selecting, according to an instruction signaling from a base station, a corresponding number of subbands from each of the subband sets for PI and/or RPI reporting;

selecting, according to a pre-defined rule, a corresponding number of subbands from each of the sub-band sets for PI and/or RPI reporting; and selecting, according to a result of the channel measurement, a corresponding number of subbands from each of the sub-band sets for PI and/or RPI reporting.

In the embodiments above, the feedback module may further be configured to select according to the result of the channel measurement a corresponding number of subbands from each of the sub-band sets for PI and/or RPI reporting, by:

calculating CQIs of the K subbands; and selecting, from the Kn subbands of the n-th subband set, Mn subbands having the highest CQIs for reporting at least one of a corresponding PI, a corresponding RPI, and information indicating the Mn subbands.

In the embodiments above, the feedback module may further be configured to select according to a pre-defined rule Mn subbands from the Kn subbands of the n-th subband set for reporting the corresponding PI and/or RPI, by at least one of:

selecting Mn subbands with the lowest frequencies from the Kn subbands;

selecting Mn subbands with the highest frequencies from the Kn subbands;

selecting from the Kn subbands Mn subbands containing subbands with the highest frequency and the lowest frequency; and selecting Mn subbands which are in a comb-shaped distribution in the Kn subbands.

In the embodiments above, the feedback module may further be configured to divide the K subbands into the N subband sets according to an pre-defined rule by at least:

dividing the K subbands into N subband sets evenly.

In the embodiments above, the feedback module may further be configured to divide the K subbands into the N subband sets according to the result of channel measurement, by at least one of:

forming subband sets, each of which includes subbands having information indicated by RPI or PI associated with a precoding codebook index, where each information differs from one another by within DR or DP, DR or DP being a predetermined value or determined by a signaling from the base station; and forming subband sets, each of which includes subbands having information indicated by RPI or PI associated with a precoding codebook index, where the information varies between the subbands in the subband set within ER or EP, ER or EP being a predetermined value or determined by a signaling from the base station.

In the embodiments above, the feedback module may further be configured to report to the base station a value of at least one of: N, Kn, and Mn.

An apparatus for Channel State Information (CSI) feedback, provided at a base station, is also provided according to an embodiment of the present disclosure, which includes:

a communication module, configured to receive, from a terminal, M subbands' Phase Indicator (PI) and/or Relative Power Indicator (RPI) of a weighted coefficient associated with a precoding codebook index of M subbands, the M subbands being selected by the terminal from K subbands of a CSI reporting band, where M and K are integers greater than or equal to 1, M<K; each subband is a set of R resource blocks (RBs), where R is an integer greater than or equal to 1.

In the embodiments above, the communication module may further be configured to notify the terminal of a value of M, by a configuration signaling.

In the embodiments above, the communication module may further be configured to notify the terminal of order information of a comb-shaped distribution of M subbands in the K subbands, by a configuration signaling.

In the embodiments above, the communication module may further be configured to notify the terminal to select from the K subbands M subbands for PI and/or RPI reporting, by an instruction signaling.

In the embodiments above, the communication module may further be configured to receive from the terminal numbering information of the M subbands of the K subbands.

In the embodiments above, the communication module may further be configured to notify the terminal to divide the K subbands of the CSI reporting band into N subband sets.

In the embodiments above, the communication module may further be configured to notify the terminal to determine one or more subbands from each of the subband sets, to form M subbands as the subbands for PI and/or RPI reporting.

In the embodiments above, the communication module may further be configured to notify the terminal to divide the K subbands of the reporting bandwidth into N subband sets, where the n-th subband set includes Kn subbands.

In the embodiments above, the communication module may further be configured to notify the terminal to determine Mn subbands from the n-th subband set, as subbands for PI or RPI reporting, where n is an integer greater than or equal to 1, and n≤N.

In the embodiments above, the communication module may further be configured to receive from the terminal at least one of: the number of subband sets, the number of subbands in each subband set, and the number of subbands for PI and/or RPI reporting in each subband set.

A storage medium is also provided according to an embodiment of the present disclosure, which have a computer program stored therein, the computer program executable by a processor for performing the steps of any one of terminal-side methods, or performing the steps of any one of base station-side methods.

In comparison with the existing technology, the embodiments of the present disclosure show the following advantageous effects:

In the technical embodiments of the present disclosure, instead of reporting the RPI and PI of every subband, only a portion of the subbands have their RPIs and PIs reported. Therefore, feedback overhead is reduced. Additionally, CSI feedback performance can be maintained because amplitude and phase information indicated by PI and RPI show a certain correlation between different subbands, and the base station can interpolate information of the rest of the subbands from the M subbands, thereby solving the problem of significant CSI feedback overhead with linear combination codebook based feedback.

DETAILED DESCRIPTION

For a better understanding of the objects, technical details and advantageous effects of the present disclosure, embodiments of the present disclosure will be described hereinafter in detail with reference to the accompanying drawings. Features in the embodiments and the embodiments themselves may be combined in any manner that does not cause conflict.

Figure 1:
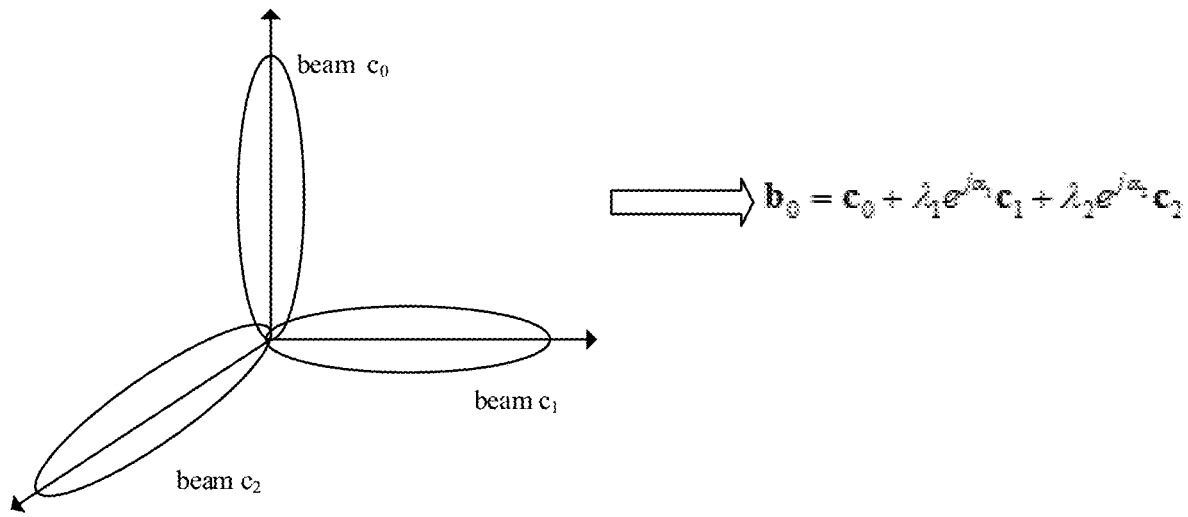
FIG. 1 is a schematic diagram of a linear combination codebook based feedback according to an embodiment of the present disclosure.

As shown in FIG. 1, in a method of CSI feedback using a linear combination based codebook, the channel information measured by the terminal according to a reference signal is quantized into a linear combination of multiple beams, i.e., the precoding codeword of each layer is a linear combination of multiple one-dimensional or two-dimensional DFT vectors. In FIG. 1, the selected beam vectors $c_0$, $c_1$, and $c_2$ may be reported by a conventional PMI, where the coefficients used in weighing the PMIs include amplitude information $\lambda_1$ and $\lambda_2$ and phase information $\alpha_1$ and $\alpha_2$, with the amplitude information reported by RPI and the phase information reported by PI. In comparison with a conventional single-path codebook PMI feedback, the feedback overhead here is greatly increased due to the need to report the RPI and PI information corresponding to each beam.

Generally, beam information in a wireless channel is less frequency selective. Therefore, in linear combination based codebook feedback, beam PMI information indicating a base vector may be reported to the base station using wideband feedback. The phase of the weighted coefficient is susceptible to such factors as delay and the random phase, hence is more frequency selective; therefore, subband feedback is required for PI. For the amplitude, i.e. RPI, of the weighted coefficient, wideband feedback can ensure a good performance; subband feedback can improve the performance, but would bring in a great overhead. Therefore, wideband feedback or subband feedback can be configured according to needs. In summary, a high-performance linear combination based codebook feedback requires subband feedback of RPI and PI for each beam.

In order to realize subband feedback of RPI and PI, a simpler method is to report the RPI and PI corresponding to each subband, which brings in a great amount of performance overhead. The phase of the weighted coefficient indicated by PI may be affected by mainly two factors: (a) the random initial phase; and (b) delays that cause a phase shift in the frequency domain. For the random initial phase, phase change in each polarization direction can be seen as a fixed value on each subband. For delays, the phase shift in the frequency domain can be seen as varies linearly with the frequency. Therefore, change of the phase indicated by PI between different frequency bands can be modeled using a linear, piecewise linear or some other function. The amplitude information indicated by RPI may only be affected by some small random factors in different frequency bands; overall it is stable. In summary, the amplitude and phase indicated by the PI and RPI corresponding to the same beam show a certain correlation between different subbands.

According to an embodiment of the present disclosure, the correlation between different subbands of the amplitude and phase indicated by the PI and RPI is used to reduce the overhead of subband feedback. A simple method is to provide the RPI and PI on only a portion of the subbands, instead of reporting the RPI and PI on each of the subbands, thereby providing a subband feedback method with reduced overhead.

Figure 2:
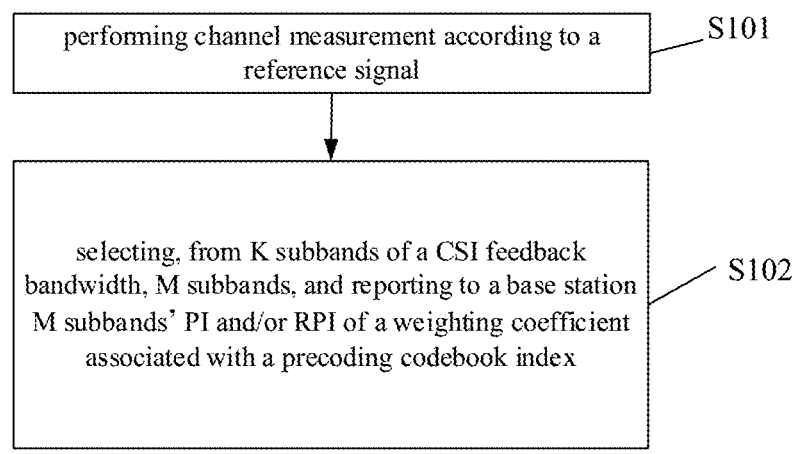
FIG. 2 is a flowchart of a method for CSI feedback according to an embodiment of the present disclosure.

As shown in FIG. 2, a method for CSI feedback, applicable to a terminal, is provided according to an embodiment of the present disclosure. The method includes:

S101. performing channel measurement according to a reference signal;

S102. selecting, from K subbands of a CSI reporting band, M subbands for feedback of PI and/or RPI of a weighted coefficient associated with a precoding codebook index;

where M and K are integers greater than or equal to 1, M<K; each subband is a set of R resource blocks (RBs), where R is an integer greater than or equal to 1.

In the embodiment of the present disclosure, the reporting bandwidth for PI and/or RPI includes a total of K subbands; the terminal reports RPI and/or PI corresponding to M subbands of the K subbands, where M is an integer greater than 0 and less than K, therefore feedback overhead is reduced. In addition, because amplitude and phase information indicated by PI and RPI show a certain correlation between different subbands, and the base station can interpolate the information of the rest of the subbands from the M subbands, the CSI feedback performance can be maintained.

The value of M is determined, according to at least one of: a configuration signaling from a base station, or a pre-defined rule.

In step S102, the M subbands for feedback of PI and/or RPI are selected from K subbands of the CSI reporting band, by at least one of:

Method 1: selecting, according to a signaling message from the base station, from the K subbands of the CSI reporting band, M subbands for PI and/or RPI reporting;

Method 2: selecting, according to a pre-defined rule, from the K subbands of the CSI reporting band, M subbands for PI and/or RPI reporting;

Method 3: selecting, according to a result of channel measurement, from the K subbands of the CSI reporting band, M subbands for PI and/or RPI reporting; and Method 4: dividing the K subbands of the CSI reporting band into N subband sets; and determining one or more subbands from each of the subband sets, to form M subbands as the subbands for PI and/or RPI reporting.

In Method 1, the signaling message may include at least one of: a physical layer signaling, an RRC signaling, an MAC signaling, DCI, and a bitmap.

Method 2 includes: selecting, according to a pre-defined rule, from K subbands, M subbands for PI and/or RPI reporting, where the pre-defined rule includes at least one of:

selecting from the K subbands M subbands with the lowest frequencies;

selecting from the K subbands M subbands with the highest frequencies;

selecting from the K subbands M subbands containing subbands with the highest and frequency and the lowest frequency; and selecting M subbands which are in a comb-shaped distribution in the K subbands.

In Method 3, the selecting according to the result of channel measurement from K subbands M subbands for PI and/or RPI reporting includes:

calculating CQIs of the K subbands, and selecting M subbands of the K subbands having the best CQIs for PI and/or RPI reporting.

According to an embodiment, in Method 3, the terminal may further report to the base station numbering information of the M subbands of the K subbands having the best CQIs. The calculation of CQIs of the K subbands may include: calculating CQIs, according to PMI, RPI and PI obtained by channel measurement.

In Method 4, the dividing K subbands of a CSI reporting band into N subband sets includes dividing according to at least one of:

a signaling message from the base station, an pre-defined rule, and a result of channel measurement.

In Method 4, the dividing K subbands into N subband sets and determining one or more subbands from each of the subband sets include:

dividing K subbands of the reporting bandwidth into N subband sets, where the n-th subband set includes Kn subbands; and determining Mn subbands from the n-th subband set, as subbands for PI or RPI reporting, n is an integer greater than or equal to 1, and n≤N. The value of Mn is determined according to at least one of: a configuration signaling from a base station, and a pre-defined rule.

According to an embodiment, the terminal reports to the base station a value of at least one of: N, Kn, and Mn.

One or more subbands are determined from each of the subband sets by at least one of:

selecting, according to a signaling message from a base station, a corresponding number of subbands from each of the subband sets for PI and/or RPI reporting;

selecting, according to a pre-defined rule, a corresponding number of subbands from each of the sub-band sets for PI and/or RPI reporting; and selecting, according to a result of the channel measurement, a corresponding number of subbands from each of the sub-band sets for PI and/or RPI reporting.

Specifically, the selecting according to a result of the channel measurement a corresponding number of subbands from each of the sub-band sets for PI and/or RPI reporting may include:

calculating CQIs of the K subbands; and selecting, from the Kn subbands of the n-th subband set, Mn subbands having the highest CQIs for reporting at least one of a corresponding PI, a corresponding RPI and information indicating the Mn subbands.

Specifically, the selecting according to a predetermined method Mn subbands from the Kn subbands of the n-th subband set for reporting a corresponding PI and/or RPI may include at least one of:

selecting Mn subbands with the lowest frequencies from the Kn subbands;

selecting Mn subbands with the highest frequencies from the Kn subbands;

selecting, from the Kn subbands, Mn subbands containing subbands with the highest frequency and a lowest frequency; and selecting Mn subbands which are in a comb-shaped distribution in the Kn subbands.

The dividing K subbands into N subband sets according to a predetermined method may include at least:

dividing the K subbands into N subband sets evenly.

The dividing K subbands into N subband sets according to a result of channel measurement may include at least one of:

forming subband sets, each of which includes subbands having information indicated by RPI or PI associated with a precoding codebook index where each information differs from one another by within DR or DP, DR or DP being a predetermined value or determined by a signaling message from a base station;

forming subband sets, each of which includes subbands having information indicated by RPI or PI associated with a precoding codebook index where the information varies between the subbands in the subband set within ER or EP, ER or EP being a predetermined value or determined by a signaling from a base station.

Figure 3:
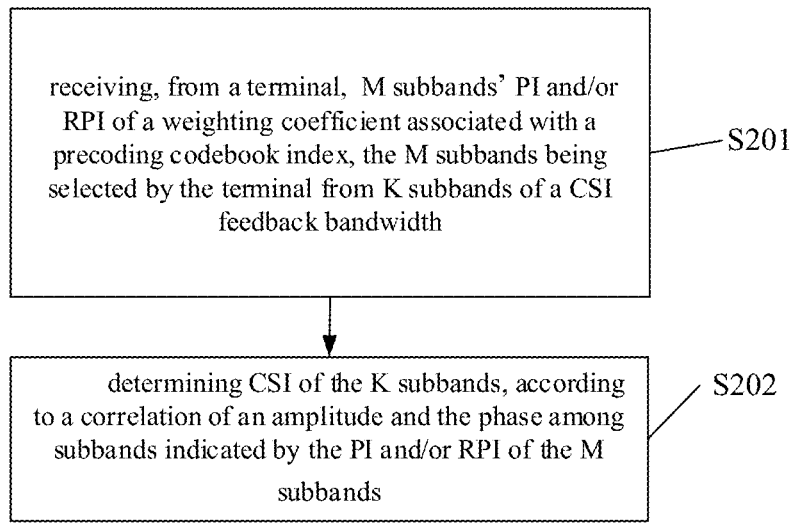
FIG. 3 is a flowchart of another method for CSI feedback according to an embodiment of the present disclosure.

As shown in FIG. 3, a method for CSI feedback, applicable to a base station, is also provided according to an embodiment of the present disclosure. The method includes:

S201. receiving, from a terminal, M subbands' PI and/or RPI of a weighted coefficient associated with a precoding codebook index, the M subbands being selected by the terminal from K subbands of a CSI reporting band;

S202. determining CSI of the K subbands, according to a correlation of an amplitude and the phase among subbands indicated by the PI and/or RPI of the M subbands;

where M and K are integers greater than or equal to 1, M<K; each subband is a set of R resource blocks RB, where R is an integer greater than or equal to 1.

The base station may notify the terminal of the value of M, by a configuration signaling.

The base station may notify the terminal of order information of a comb-shaped distribution of M subbands in the K subbands, by a configuration signaling.

The base station may notify the terminal to select from the K subbands M subbands for PI and/or RPI reporting, by a signaling message.

Specifically, the signaling message may include at least one of: a physical layer signaling, an RRC signaling, a MAC signaling, DCI, and a bitmap.

The base station may further receive from the terminal numbering information of the M subbands of the K subbands.

According to an embodiment, the notifying the terminal to select from the K subbands M subbands for PI and/or RPI reporting by a signaling message includes:

notifying the terminal to divide K subbands of the reporting bandwidth into N subband sets; and determining one or more subbands from each of the subband sets, to form M subbands as the subbands for PI and/or RPI reporting.

This method may further include: notifying the terminal to divide the K subbands of a CSI reporting band into N subband sets, where the n-th subband set includes Kn subbands; and determining Mn subbands from the n-th subband set, as subbands for PI or RPI reporting, n is an integer greater than or equal to 1, and n≤N.

The base station may receive from the terminal at least one of: the number of subband sets, the number of subbands in each subband set, and the number of subbands for PI or RPI reporting in each subband set.

Figure 4:
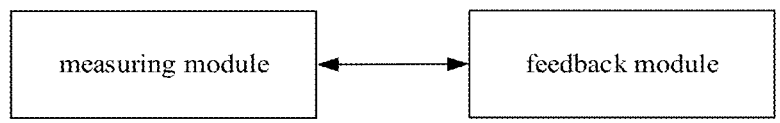
FIG. 4 is a schematic structural diagram of an apparatus for CSI feedback according to an embodiment of the present disclosure.

To realize the methods of the embodiments of the present disclosure, as shown in FIG. 4, an apparatus for CSI feedback, provided at a terminal, is provided according to according to an embodiment of the present disclosure. The apparatus includes:

a measuring module, configured to perform channel measurement according to a reference signal;

a feedback module, configured to select, from K subbands of a CSI reporting band, M subbands, and report to a base station the M subbands' PI and/or RPI of a weighted coefficient associated with a precoding codebook index;

where M and K are integers greater than or equal to 1, M<K; each subband is a set of R resource blocks RB, where R is an integer greater than or equal to 1.

The feedback module may further be configured to determine the value of M according to a configuration signaling from a base station, or a pre-defined rule.

The feedback module may select from the K subbands of the CSI reporting band M subbands for feedback of PI and/or RPI, by at least one of:

selecting, according to a signaling message from the base station, from the K subbands of the CSI reporting band, M subbands for PI and/or RPI reporting;

selecting, according to a pre-defined rule, from the K subbands of the CSI reporting band, M subbands for PI and/or RPI reporting;

selecting, according to a result of channel measurement, from the K subbands of the CSI reporting band, M subbands for PI and/or RPI reporting.

The feedback module may select, according to a pre-defined rule, from K subbands, M subbands for PI and/or RPI reporting, where the pre-defined rule includes at least one of:

selecting M subbands with the lowest frequencies from the K subbands;

selecting M subbands with the highest frequencies from the K subbands;

selecting from the K subbands M subbands containing subbands with the highest frequency and the lowest frequency; and selecting M subbands which are in a comb-shaped distribution in the K subbands.

The feedback module may select according to a result of channel measurement from K subbands M subbands for PI and/or RPI reporting, by:

calculating CQIs of the K subbands, and selecting M subbands of the K subbands having the best CQIs for PI and/or RPI reporting.

The feedback module may further be configured to report to the base station numbering information of the M subbands of the K subbands having the best CQIs.

The feedback module may calculate the CQIs of the K subbands, by:

calculating the CQIs, according to Precoding Matrix Indicators (PMIs), Relative Power Indicators (RPIs) and Phase Indicators (PIs) obtained from the channel measurement.

The feedback module may divide the K subbands of the CSI reporting band into N subband sets according to at least one of:

a signaling from the base station, an pre-defined rule, and a result of channel measurement.

The dividing K subbands into N subband sets and determining one or more subbands from each of the subband sets include:

dividing K subbands of the reporting bandwidth into N subband sets, where the n-th subband set includes Kn subbands; and determining Mn subbands from the n-th subband set, as subbands for PI or RPI reporting, n is an integer greater than or equal to 1, and n≤N.

Determining the value of Mn includes determining according to a configuration signaling from a base station, or a pre-defined rule.

The feedback module may determine one or more subbands from each of the subband sets, by at least one of:

selecting, according to a signaling message from a base station, a corresponding number of subbands from each of the subband sets for PI or RPI reporting;

selecting, according to a pre-defined rule, a corresponding number of subbands from each of the sub-band sets for PI or RPI reporting; and selecting, according to a result of the channel measurement, a corresponding number of subbands from each of the sub-band sets for PI or RPI reporting.

The feedback module may select according to the result of the channel measurement the corresponding number of subbands from each of the sub-band sets for PI and/or RPI reporting, by:

calculating CQIs of the K subbands, and selecting, from the Kn subbands of the n-th subband set, Mn subbands having the highest CQIs for reporting at least one of a corresponding PI, a corresponding RPI, and information indicating the Mn subbands.

The feedback module may select according to a predetermined method Mn subbands from the Kn subbands of the n-th subband set for reporting the corresponding PI and/or RPI, by at least one of:

selecting Mn subbands with the lowest frequencies from the Kn subbands;

selecting Mn subbands with the highest frequencies from the Kn subbands;

selecting, from the Kn subbands, Mn subbands containing subbands with the highest frequency and the lowest frequency; and selecting Mn subbands which are in a comb-shaped distribution in the Kn subbands.

The feedback module may divide the K subbands into N subband sets according to an pre-defined rule by at least:

dividing the K subbands into N subband sets evenly.

The feedback module may divide K subbands into N subband sets according to a result of channel measurement, by at least one of:

forming subband sets, each of which includes subbands having information indicated by RPI or PI associated with a precoding codebook index where each information differs from one another by within DR or DP, DR or DP being a predetermined value or determined by a signaling from the base station; and forming subband sets, each of which includes subbands having information indicated by RPI or PI associated with a precoding codebook index where the information varies between the subbands in the subband set within ER or EP, ER or EP being a predetermined value or determined by a signaling from the base station.

The feedback module may report to the base station a value of at least one of: N, Kn, and Mn.

In practice, the measurement module and the feedback module may be implemented with a processor in conjunction with a communication interface in an apparatus for CSI feedback.

Figure 5:
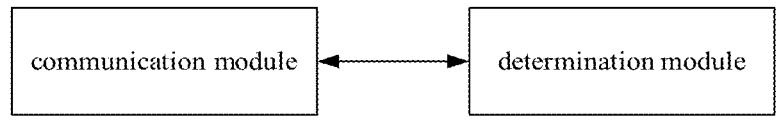
FIG. 5 is a schematic structural diagram of an apparatus for CSI feedback according to an embodiment of the present disclosure.

To realize the methods of the embodiments of the present disclosure, as shown in FIG. 5, an apparatus for CSI feedback, provided at a base station, is provided according to an embodiment of the present disclosure. The apparatus includes:

a communication module, configured to receive, from a terminal, M subbands' PI and/or RPI of a weighted coefficient associated with a precoding codebook index, the M subbands being selected by the terminal from K subbands of a CSI reporting band;

a determination module, configured to determine CSI of the K subbands, according to a correlation of the amplitude and the phase among subbands indicated by the PI and/or RPI of the M subbands;

where M and K are integers greater than or equal to 1, M<K; each subband is a set of R resource blocks (RBs), where R is an integer greater than or equal to 1.

The communication module may further be configured to notify the terminal of the value of M, by a configuration signaling.

The communication module may further be configured to notify the terminal of order information of a comb-shaped distribution of M subbands in the K subbands, by a configuration signaling.

The communication module may further be configured to notify the terminal to select from the K subbands M subbands for PI and/or RPI reporting, by a signaling message.

The communication module may further be configured to receive from the terminal numbering information of the M subbands of the K subbands.

The communication module may further be configured to notify the terminal to divide K subbands of the CSI reporting band into N subband sets.

The communication module may further be configured to notify the terminal to determine one or more subbands from each of the subband sets, to form M subbands as the subbands for PI and/or RPI reporting.

The communication module may further be configured to notify the terminal to divide the K subbands of a CSI reporting band into N subband sets, where the n-th subband set includes Kn subbands.

The communication module may further be configured to notify the terminal to determine Mn subbands from the n-th subband set, as subbands for PI or RPI reporting, n is an integer greater than or equal to 1, and n≤N.

The communication module may further be configured to receive from the terminal at least one of: the number of subband sets, the number of subbands in each subband set, and the number of subbands for PI or RPI reporting in each subband set.

In practice, the communication module may be implemented with a processor in conjunction with a communication interface in an apparatus for CSI feedback; the determination module may be implemented with a processor in an apparatus for CSI feedback.

It should be noted that, the separation of program modules inside the CSI feedback apparatus is described above according to the embodiments by way of example; in practice, other forms of separation of program modules may be implemented. In other words, the internal structure of the apparatus may be divided into a different set of program modules, to complete all or part of the processing described above. In addition, the CSI feedback apparatus provided in the embodiments above relates to the same invention as the CSI feedback method implementation below; hence the details of apparatus implementation will be omitted.

Embodiment 1

Figure 6:
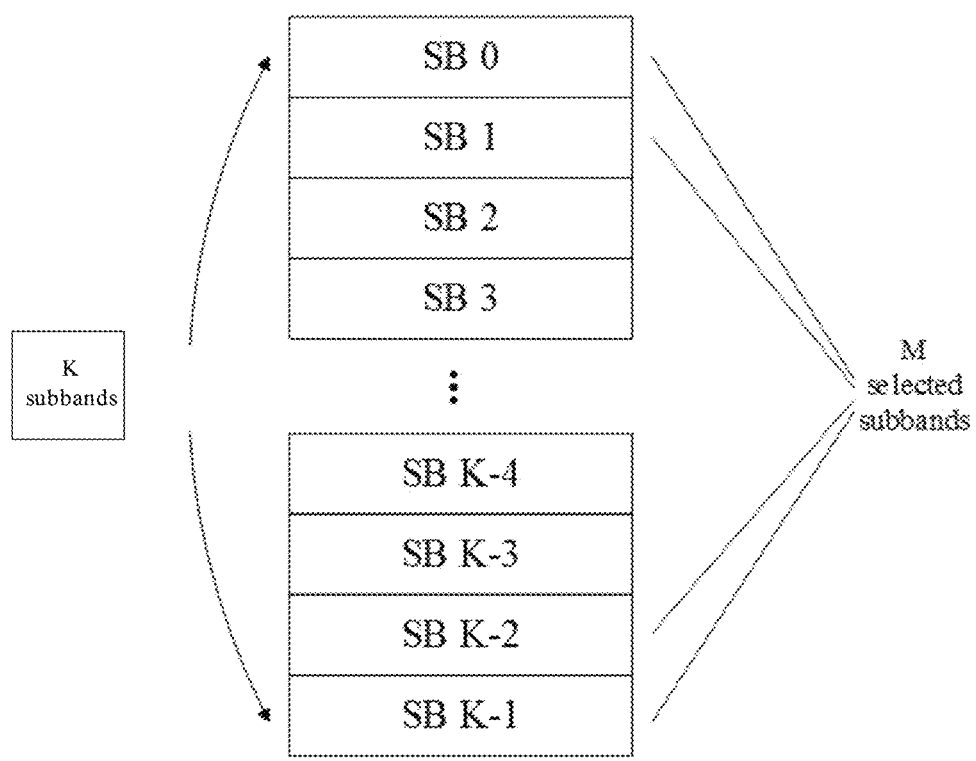
FIG. 6 is a schematic diagram of subband feedback according to Embodiment 1 of the present disclosure.

With reference to FIG. 6, this embodiment shows the selecting from K subbands of a CSI reporting band M subbands may include:

determining, by a terminal, the value of M and M subbands from the K subbands in various methods.

Method 1: Signaling notification from the base station. A base station may notify by a higher-layer or physical-layer signal, the terminal to report PRI and/or PI on M subbands of the K subbands. For example, the base station may notify by a bitmap the terminal of how to select M subbands from the K subbands. The signaling may be a higher-layer signaling such as an RRC or MAC signaling, to achieve a semi-static, semi-persistent configuration; or, a PHY signaling such as DCI, to achieve a dynamic configuration.

Figure 8:
FIG. 8 is a schematic diagram of the comb-shaped distribution according to Embodiment 1 of the present disclosure.

Method 2: Pre-defined rule. The terminal may select, according to a pre-defined rule, from K subbands, M subbands that are relatively fixed, for example:

1. the M subbands may be subbands of the K subbands having the lowest frequencies;

2. the M subbands may be subbands of the K subbands having the highest frequencies;

3. the M subbands may contain subbands of the K subbands having the highest and lowest frequencies;

4. the M subbands may have a comb-shaped distribution in the K subbands (shown in FIG. 8), in which case the base station may determine the value of M by notifying the order of a comb-shaped distribution by signaling.

Method 3: The terminal determines on its own based on a result of channel measurement. The terminal performs channel measurement according to a reference signal, calculates RPI and/or PI of each subband, calculates CQI of each subband based on the RPI, RI, PI, PMI, etc., and report the RPIs and/or PIs of the M subbands having the best CQIs and report the corresponding numbering of the M subbands.

The methods above can reduce the overhead on subband feedback of PRI and PI, while maintaining the CSI feedback performance.

Embodiment 2

Figure 7:
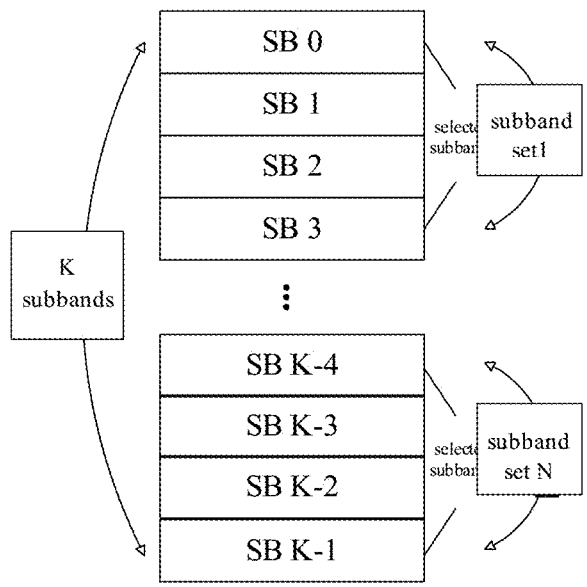
FIG. 7 is a schematic diagram of subband feedback according to Embodiment 2 of the present disclosure.

This embodiment shows a particular example of channel information quantization and feedback. According to the embodiment, K subbands of a CSI reporting band are divided into N subband sets, each subband set including Kn subbands. In RPI and PI feedback, the terminal selects Mn subbands from the Kn subbands of the n-th subband set, for reporting a corresponding PI or RPI, shown in FIG. 7.

The terminal may determine how to select Mn subbands from the Kn subbands of the n-th subband set for reporting a corresponding PI or RPI in various methods.

Method 1: Signaling notification from the base station. A base station may notify by a higher-layer or physical-layer signal, the terminal to report PRI and/or PI on Mn subbands of the Kn subbands. For example, the base station may notify by a bitmap the terminal of how to select Mn subbands from the Kn subbands. The signaling may be a higher-layer signaling such as an RRC or MAC signaling, to achieve a semi-static, semi-persistent configuration; or, an PHY signaling such as DCI, to achieve a dynamic configuration.

Method 2: Pre-defined rule. The terminal may select, according to a pre-defined rule, from Kn subbands, Mn subbands that are relatively fixed, for example:

1. the Mn subbands may be subbands of the Kn subbands having the lowest frequencies;
2. the Mn subbands may be subbands of the Kn subbands having the highest frequencies;
3. the Mn subbands may contain subbands of the Kn subbands having the highest and lowest frequencies;
4. the Mn subbands may have a comb-shaped distribution in the Kn subbands, in which case the base station may determine the value of M by notifying the order of a comb distribution by signaling.

Method 3: The terminal determines on its own based on a result of channel measurement. The terminal performs channel measurement according to a reference signal, calculates RPIs and/or PIs of the Kn subbands in the n-th subband set, calculates CQIs of the Kn subbands based on the RPI, RI, PI, PMI, etc., and report the RPIs and/or PIs of the M subbands having the best CQIs and report the corresponding numbering of the M subbands.

Another problem to be solved by the method is the division of subband sets. The terminal may determine the division of subband sets in the following three methods.

Method A: The terminal may determine the values of N, Kn and Mn according to an instruction signaling from the base station. The signal may be a higher-layer signaling such as an RRC or MAC signaling, to achieve a semi-static, semi-persistent configuration; or, an PHY signaling such as DCI, to achieve a dynamic configuration.

Method B: The terminal may determine the values of N, Kn and Mn according to a pre-defined rule including at least one of:

1. Mn equals to 1 or 2, i.e., 1 or 2 subbands are selected from each subband set for RPI and/or PI reporting;
2. Kn is a constant for n=1, . . . , N, Kn, i.e., the K subbands are divided evenly;
3. Mn is a constant for n=1, . . . , N, Kn.

Method C: The terminal may determine the values of N, Kn and Mn according to a channel measurement. The terminal may calculate RPI and PI on each subband, and group subbands with RPIs and PIs in a certain range together to form a subband set. Specifically, the terminal may calculate RPIs and PIs on K subbands, and group subbands to form the subband set. RPI or PI of subband in the subband set differs from each other by within DR or DP. DR or DP are predetermined values or determined by a signaling from the base station. The terminal may report the values of N, Kn and Mn. A special case is when the K subbands are divided evenly into N subband sets; in this case the terminal only needs to report the value of N.

Method D: The terminal may determine the values of N, Kn and Mn according to a channel measurement. The terminal may calculate RPI and/or PI on each subband, and group subbands with RPIs and PIs meeting a certain rule together, to form a subband set. The terminal may group subbands having information indicated by RPI and/or PI, together to form a subband set, where the information has similar variation. Specifically, if RPIs and/or PIs on different subbands have similar polynomial functions, these subbands may be grouped into a subband set. In particular, if the variation of RPIs and/or PIs between subbands is within ER or EP, these subbands may be grouped into a subband set. ER or EP may be predetermined values; or DR or DP may be determined by a signaling from a base station. The terminal may report the values of N, Kn and Mn. A special case is when the K subbands are divided evenly into N subband sets; in this case the terminal only needs to report the value of N.

The method above can ensure a good feedback performance even when channel estimation is affected by frequency selective noise or interference, and reduce feedback overhead.

Embodiment 3

This embodiment shows a particular example of channel information feedback. The base station sends a reference signal to the terminal. The terminal reports CSI according to a measurement on the reference signal. CSIs of multiple subbands are to be reported on the CSI reporting band; the terminal selects, according to the result of channel measurement, a portion of the subbands for CSI feedback, and reports subband selection information to the base station. The subband selection information includes at least one of:

1. Information indicating a selection of M subbands, where the M subbands are selected for RPI and/or PI reporting from K subbands of a CSI reporting band;
2. Information indicating a division of N subband sets and a selection of Mn subband sets, where the K subbands of a CSI reporting band are divided into N subband sets, with the n-th subband set including Kn subbands, and Mn subbands are selected from the Kn subbands.

The terminal reports the information above on a PUCCH or PUSCH, in at least one of the following ways:

1. In PUCCH feedback, the terminal reports M, N, Kn, and Mn related information in a first slot, and reports RPI and/or PI information in a second slot, the first slot being prior to the second slot;

2. In long-PUCCH feedback, the terminal carries M, N, Kn, and Mn related information on a first OFDM symbol or symbol group, and carries RPI and/or PI information on a second OFDM symbol or symbol group, the first OFDM symbol or symbol group being prior to the second OFDM symbol or symbol group;

3. In PUSCH feedback, the terminal maps M, N, Kn, and Mn related information to a Resource Element (RE) near a front-loaded DMRS, and maps RPI and/or PI information to a following RE.

4. M, N, Kn and Mn related information is mapped to a RE near the RI mapping position;

5. M, N, Kn and Mn related information are jointly reported with RI.

According to an exemplary embodiment, the present disclosure also provides a storage medium, more specifically, a computer-readable storage medium such as a memory containing a computer program, the computer program being executable by a processor of a CSI feedback apparatus to perform the steps in the methods above. The computer-readable storage medium may include Ferromagnetic Random Access Memory (or, Programmable Read-Only Memory, FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, Magnetic Storage, Optical Disk, or Compact disc read-only memory (CD-ROM), including computer-executable instructions, such as program code, executed by computer.

While the embodiments of the present disclosure contains many specifics, these should not be construed as limitations on the scope of any invention or of what may be claimed, but rather as descriptions of features that may be specific to particular embodiments of particular inventions. Various modifications and adaptations may be made by those skilled in the art without departing from the scope of the invention as defined in the appended claims. The scope of the invention, therefore, shall be defined solely by the following claims.

What is claimed is:

1. A method for wireless communication, comprising:
   performing, by a terminal device, a channel measurement based on a Channel State Information (CSI) reference signal from a base station; and
   configuring, by the terminal device, a CSI feedback report based on the channel measurement as one of a wideband feedback or a subband feedback according to a configuration from the base station, wherein the CSI feedback report includes a phase coefficient indicator and an amplitude coefficient indicator that are associated with a precoding codebook index indicating a precoding codebook that is a linear combination of a set of vectors, and wherein, in response to the CSI feedback report being configured as a subband feedback, the CSI feedback report includes information of M subbands selected from K subbands of a Channel State Information (CSI) reporting band, wherein M and K are integers greater than or equal to 1, wherein M<K, and wherein the M subbands are in a comb-shaped distribution in the K subbands; and
   transmitting, by the terminal device, the CSI feedback report to the base station.

2. The method of claim 1, wherein the M subbands are selected from the K subbands by:
   dividing the K subbands evenly into one or more subband sets; and
   selecting one subband from each of the one or more subband sets.

3. The method of claim 1, wherein the phase coefficient indicator is associated with a weighted coefficient used in the linear combination of the set of vectors.

4. The method of claim 1, wherein the phase coefficient indicator and the amplitude coefficient are reported as a precoding matrix indicator (PMI) in the CSI feedback report.

5. A method for wireless communication, comprising:
   receiving, by a base station, a Channel State Information (CSI) feedback report from a terminal device based on a channel measurement,
   wherein the CSI feedback report includes a phase coefficient indicator and an amplitude coefficient indicator that are associated with a precoding codebook index indicating a precoding codebook that is a linear combination of a set of vectors, wherein the CSI feedback report corresponds to a wideband feedback or a subband feedback based on a configuration from the base station, and wherein, in response to the CSI feedback report being configured as a subband feedback, the CSI feedback report includes information of M subbands selected from K subbands of a Channel State Information (CSI) reporting band,
   wherein M and K are integers greater than or equal to 1, wherein M<K, and wherein the M subbands are in a comb-shaped distribution in the K subbands.

6. The method of claim 5, wherein the M subbands are selected from the K subbands by:
   dividing the K subbands evenly into one or more subband sets; and
   selecting one subband from each of the one or more subband sets.

7. The method of claim 5, wherein the phase coefficient indicator is associated with a weighted coefficient used in the linear combination of the set of vectors.

8. The method of claim 5, wherein phase coefficient indicator and the amplitude coefficient are reported as a precoding matrix indicator (PMI) in the CSI feedback report.

9. An apparatus for wireless communication, comprising a processor that is configured to:
   perform a channel measurement based on a Channel State Information (CSI) reference signal from a base station; and
   configure a CSI feedback report based on the channel measurement as one of a wideband feedback or a subband feedback according to a configuration from the base station, wherein the CSI feedback report includes a phase coefficient indicator and an amplitude coefficient indicator that are associated with a precoding codebook index indicating a precoding codebook that is a linear combination of a set of vectors, and
   wherein, in response to the CSI feedback report being configured as a subband feedback, the CSI feedback report includes information of M subbands selected from K subbands of a Channel State Information (CSI) reporting band, wherein M and K are integers greater than or equal to 1, wherein M<K, and wherein the M subbands are in a comb-shaped distribution in the K subbands; and
   transmit the CSI feedback report to the base station.

10. The apparatus of claim 1, wherein the M subbands are selected from the K subbands by:
dividing the K subbands evenly into one or more subband sets; and
selecting one subband from each of the one or more subband sets.

11. The apparatus of claim 9, wherein the phase coefficient indicator is associated with a weighted coefficient used in the linear combination of the set of vectors.

12. The apparatus of claim 1, wherein the phase coefficient indicator and the amplitude coefficient are reported a precoding matrix indicator (PMI) in the CSI feedback report.

13. An apparatus for wireless communication, comprising a processor that is configured to:
receive a Channel State Information (CSI) feedback report from a terminal device based on a channel measurement,
wherein the CSI feedback report includes a phase coefficient indicator and an amplitude coefficient indicator that are associated with a precoding codebook index indicating a precoding codebook that is a linear combination of a set of vectors, wherein the CSI feedback report corresponds to a wideband feedback or a subband feedback, and
wherein, in response to the CSI feedback report being configured as a subband feedback, the CSI feedback report includes information of M subbands selected from K subbands of a Channel State Information (CSI) reporting band, wherein M and K are integers greater than or equal to 1, wherein M<K, and wherein the M subbands are in a comb-shaped distribution in the K subbands.

14. The apparatus of claim 13, wherein the M subbands are selected from the K subbands by:
dividing the K subbands evenly into one or more subband sets; and
selecting one subband from each of the one or more subband sets.

15. The apparatus of claim 13, wherein the phase coefficient indicator is associated with a weighted coefficient used in the linear combination of the set of vectors.

16. The apparatus of claim 13, wherein phase coefficient indicator and the amplitude coefficient are reported as a precoding matrix indicator (PMI) in the CSI feedback report.

* * * * *

UNITED STATES PATENT AND TRADEMARK OFFICE
CERTIFICATE OF CORRECTION

PATENT NO. : 11,539,418 B2
APPLICATION NO. : 17/361121
DATED : December 27, 2022
INVENTOR(S) : Hao Wu et al.

It is certified that error appears in the above-identified patent and that said Letters Patent is hereby corrected as shown below:

In the Claims

Column 21, Line 11, in Claim 12:
Delete "reported a" and insert --reported as a--, therefor.

Signed and Sealed this
Fourteenth Day of March, 2023

Katherine Kelly Vidal
*Director of the United States Patent and Trademark Office*